Feb. 11, 1958     H. BARTHOLOMÉ     2,822,790
INTERNAL COMBUSTION ENGINE
Filed May 16, 1956     3 Sheets-Sheet 3
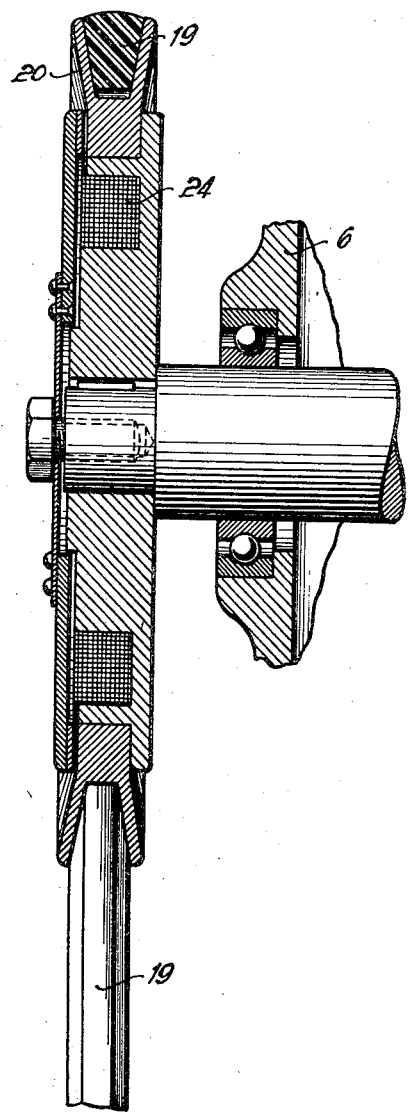

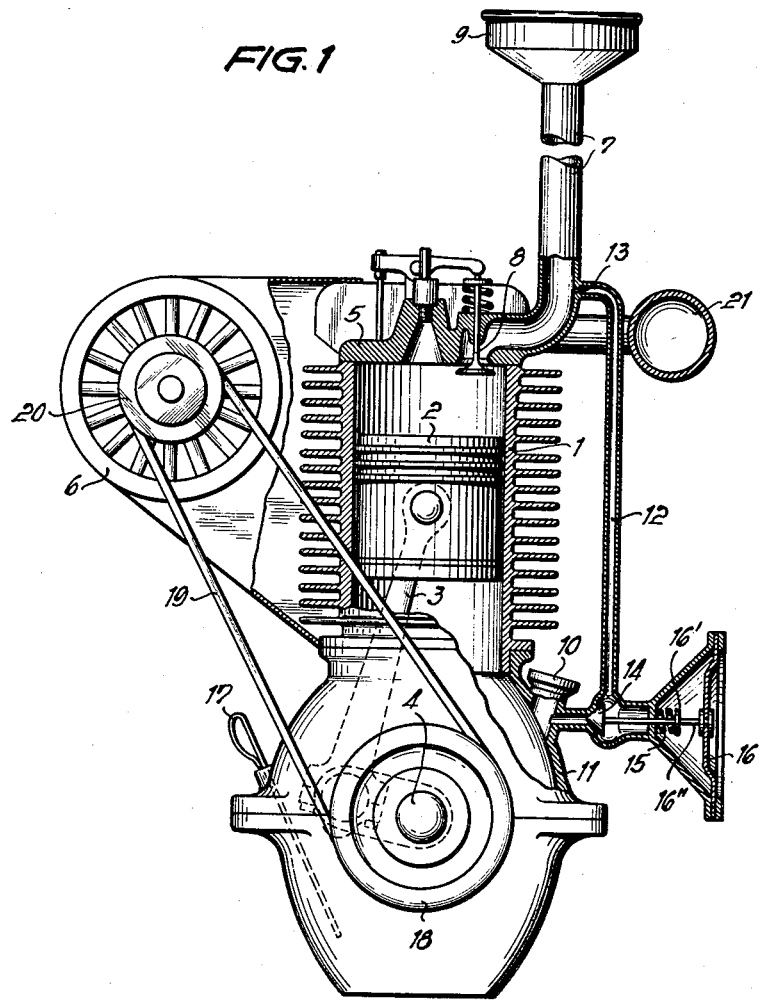

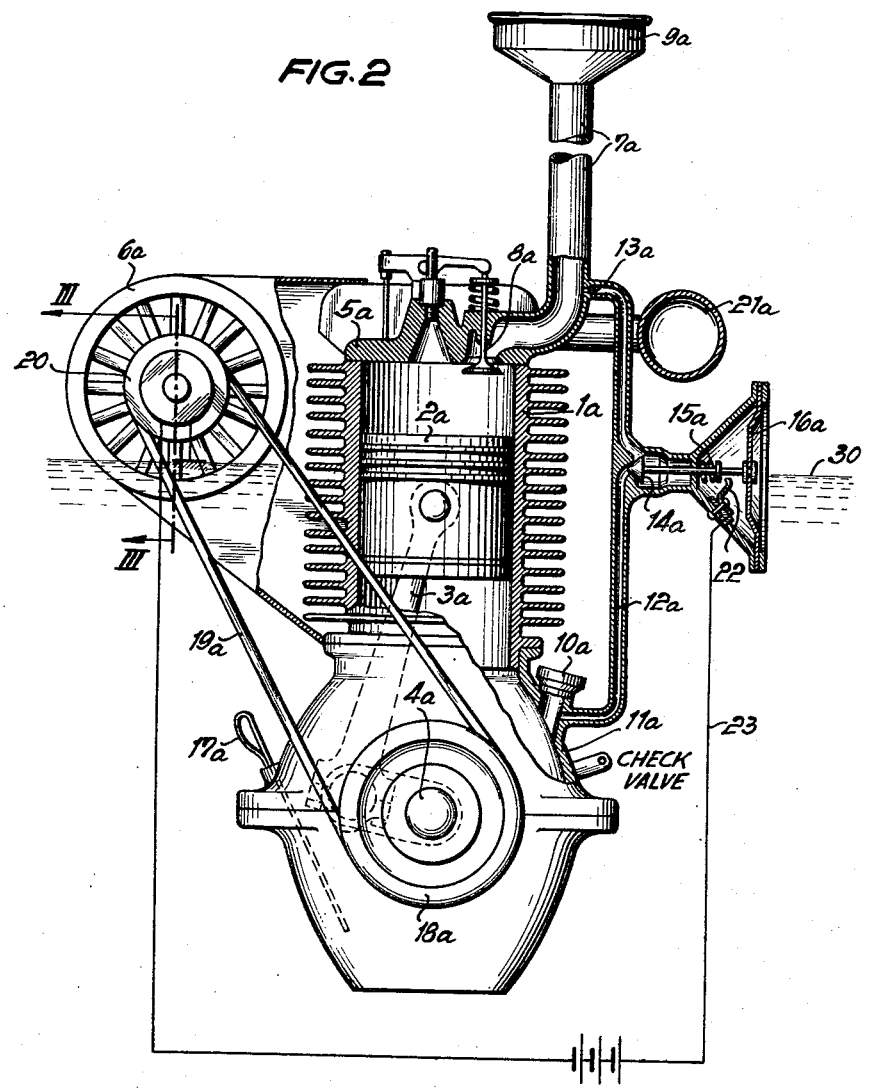

2,822,790

INTERNAL COMBUSTION ENGINE

Herbert Bartholomé, Neu Ulm (Danube), Germany, assignor to Klöckner-Humboldt-Deutz Aktiengesellschaft, Koln, Germany Application May 16, 1956, Serial No. 585,316

Claims priority, application Germany May 26, 1955

7 Claims. (Cl. 123—41.11)

The present invention relates to internal combustion engines for driving vehicles, especially street vehicles. Such engines are sometimes so designed that when passing through a river, they can also be operated partly or entirely immerged in water. To this end, a conduit for taking in combustion air is extended upwardly beyond the highest water level considered for the particular vehicles equipped with such engines. On top of said conduit there is arranged an air filter. A venting conduit connects the crankcase of the engine with the intake conduit for the air so that the venting of the crankcase can be effected through the intake conduit of the engine. Expediently, a choke is arranged within said venting conduit.

Heretofore known arrangements of the above mentioned type have the drawback that when a vehicle equipped with such engine passes through water, water will enter the crankcase along the seals around the shaft. Furthermore, when heretofore known engines of the above mentioned type are provided with a blower for the cooling air, there exists the danger that when the power intake of the blower while the engine passes through water exceeds the power intake when the vehicle equipped with such engine moves on land, the driving elements will be overloaded with the results inherent to such overload.

It is, therefore, an object of this invention to provide an engine for driving vehicles, which when such vehicles pass through water will under all circumstances prevent water from entering the crankcase of the engine.

It is another object of this invention to provide an internal combustion engine of the above mentioned type which co-operates with a blower for cooling air, and in which the danger of overloading the driving elements when the rotor of the blower immerges in water will be impossible.

These and other objects and advantages of the invention will appear more clearly from the following specification in connection with the accompanying drawings in which:

Fig. 1 illustrates a partial vertical section through an air-cooled four stroke cycle engine according to the present invention.

Fig. 2 represents a section somewhat similar to Fig. 1 but somewhat modified over that of Fig. 1.

Fig. 3 is a partial section taken on the line III—III of Fig. 2 but on a scale considerably larger than that of Fig. 2.

*General arrangement*

The present invention consists primarily in that a shut-off valve is arranged in the venting conduit of the internal combustion engine, which valve is closed during the operation of the engine under water. The closing of the shut-off valve is in conformity with the present invention, preferably effected by the water pressure itself, for instance by means of a diaphragm exposed to the water pressure. By shutting off the venting conduit in this way, the unavoidable losses in combustion gases which pass from the combustion chamber by the piston rings into the crankcase will in a very short time bring about an increase in pressure in the crankcase. This increased pressure will prevent water from entering into the crankcase. Without the pressure increase in the crankcase, according to the present invention, there would exist the danger that water will enter from the outside between the shaft seals into the crankcase.

The pressure increase produced in conformity with the present invention is advantageously selected in conformity with the maximum water pressure that may occur along the seals for the shaft. In other words, the pressure increase is expediently limited by a high pressure relief valve adjustable for such maximum water pressure. The above mentioned shut-off valve may be designed so as simultaneously to act as high pressure relief valve and may be adjusted by the water pressure directly acting upon the diaphragm in conformity with the respective desired pressure conditions.

In further development of the invention, the shut-off valve or diaphragm may be coupled to a switch for disconnecting a shaft clutch arranged in the driving train of a cooling air blower for the internal combustion engine. According to a very simple construction, the shaft clutch is designed as magnetic cltuch and is made ineffective by interrupting the electric circuit for said magnetic clutch. The shut-off valve or the diaphragm is preferably arranged at such a level that the operation of the blower is interrupted when the power intake of the blower during the immersion in water exceeds the power intake during the drive of the engine equipped vehicle over land. Such automatic switch--off mechanism for the blower drive eliminates the danger of overloading the driving train for the blower. Such danger of overloading the driving train for the blower would exist when the blower were driven while immerging in water, in which instance the power intake for the blower will exceed the normal intake of the blower many times.

*Structural arrangement*

Referring now to the drawings in detail, and Fig. 1 thereof in particular, the arrangement shown therein comprises a working cylinder 1 having reciprocally mounted therein a piston 2 for conveying its work upon the crankshaft 4 through the intervention of the connecting rod 3. Arranged in the cylinder head 5 are the inlet and outlet valves controlled by the crankshaft 4 (one valve only being shown). The blower 6 for the working cylinder is arranged laterally of the cylinder block.

The air intake conduit 7 which leads to an inlet valve 8 of the cylinder head is extended upwardly to such a level that the upper end of the conduit 7 which carries an air intake filter 9 will not immerse in the water when the engine passes through water.

The crankcase 11 of the internal combustion engine of Fig. 1 is furthermore provided with an oil intake connection 10. Communicating with the connection 10 is a conduit 12 which leads upwardly into the air inlet conduit 7. Normally, the crankcase is vented through the conduit 12. The conduit 12 is preferably provided with a choke 13 in order to prevent the pressure variations in the crankcase from being transferred into the intake conduit 7.

According to the present invention, the oil intake connection 10 of the crankcase 11 communicates with the shut-off valve 14. A weak spring 15 continuously tends to open the shut-off valve 14 but when the engine immerges in the water is prevented from doing so by the water pressure acting from the outside upon a diaphragm 16. As will be evident from the drawing, the valve member 14 is fixedly connected to the diaphragm 16 while the pressure spring 15 continuously acts upon a collar 16' on the valve rod 16". The load exerted by the water pressure upon the shut-off valve brings about that due to the sealing losses of the piston 2, a pressure increase will occur in the crankcase 11. As a result of said pressure increase, water is prevented from entering the crankcase along the passage for the crankshaft. It is a matter of course that the oil intake connection 10 and the passage for the oil measuring stick 17 will have to be properly sealed.

A belt pulley 18 is connected to one end of the crankshaft 4 and is adapted through the intervention of a V-belt 19 and a further belt pulley 20 to drive the blower 6 for the cooling air. The exhaust conduit of the engine is designated with the reference numeral 21.

The embodiment of Fig. 2 corresponds substantially to that of Fig. 1 and, accordingly, corresponding parts have been designated with the same reference numerals as in Fig. 1 but with the affix "a." The difference between the embodiment of Fig. 1 and that of Fig. 2 consists in that with the latter the shut-off valve 14a and the diaphragm 16a are arranged at a different level. More specifically, the valve 14 and the diaphragm 16 are arranged at such a level that, when the engine immerges to the extent indicated by the water level 30, at which level the blower encounters a considerable resistance, the switch 22 of the circuit 23 is automatically opened. As a result thereof, the current for the coil 24 is cut off (Fig. 3) which coil pertains to the magnetic clutch built into the pulley 20 for the blower 6. Consequently, the drive for the blower is interrupted. Otherwise the valve 14a operates and reacts in the same manner as the valve 14 of Fig. 1.

It is, of course, understood that the present invention is, by no means, limited to the particular construction shown in the drawings but also comprises any modification within the scope of the appended claims. The conduit 12 e. g., instead of being connected to the air intake conduit 7, might be separately extended upwardly beyond the highest water level.

What I claim is:

1. In combination in an internal combustion engine for use in connection with land vehicles adapted to drive through water: a cylinder, a piston reciprocably mounted in said cylinder, air inlet valve means for admitting air into said cylinder, an air intake conduit having one end connected to said engine for communication with said inlet valve means and having its other end extended upwardly so as to remain above the highest level of the water through which the vehicle to be equipped with said engine may pass, a crank case supporting said cylinder, venting conduit means effecting communication between said crank case and said air intake conduit for venting said crank case, valve means arranged within said venting conduit means and movable from a normally open position into a closing position for interrupting communication between said crank case and said air intake conduit, and means responsive to a certain water pressure acting thereupon while said vehicle is passing through water to cause said valve means to move into said closing position.

2. In combination in an internal combustion engine for use in connection with a land vehicle adapted to drive through water: a cylinder; a piston reciprocably mounted in said cylinder; air inlet valve means for admitting air into said cylinder; an air intake conduit having one end connected to said engine for communication with said inlet valve means and having its other end extended upwardly so as to remain above the highest level of the water through which the vehicle to be equipped with said engine may drive; a crank case supporting said cylinder; venting conduit means effecting communication between said crank case and said intake conduit for venting said crank case; valve means arranged within said venting conduit means and movable from an open position for effecting communication between said crank case and said intake conduit into closing position for preventing such communication, and vice versa; spring means normally holding said valve means in said open position; and water pressure responsive means operatively connected with said valve means for moving said valve means into closing position against the thrust of said spring means in response to a certain water pressure exerted by the water through which said vehicle is driving upon said water responsive means.

3. An arrangement according to claim 2, in which said water pressure responsive means includes a diaphragm unilaterally exposed to the water through which the vehicle is driving.

4. In combination in an internal combustion engine for use in connection with land vehicles adapted to drive through water: a cylinder, a piston reciprocably mounted in said cylinder, air inlet valve means for admitting air into said cylinder, an air intake conduit having one end connected to said engine for communicating with said inlet valve means and having its other end extended upwardly so as to remain above the highest level of the water through which the vehicle to be equipped with said engine may pass, a crank case supporting said cylinder, venting conduit means effecting communication between said crank case and said air intake conduit for venting said crank case, valve means arranged within said venting conduit means and movable from a normally open position for effecting communication between said crank case and said intake conduit into a closing position for preventing such communication, and means responsive to a certain water pressure acting thereupon while said vehicle is passing through water to cause said valve means to move into said closing position thereby causing the pressure in said crank case to build up to a pressure higher than said certain water pressure, said valve means including check valve means connected to said crank case and adapted to open toward the outside in response to a predetermined pressure in said crank case for limiting the maximum pressure in said crank case.

5. In combination in an internal combustion engine for use in connection with a land vehicle adapted to drive through water: a cylinder provided with cooling fins, a blower for blowing cooling air around said fins, driving means for driving said blower, electrically operable clutch means for effecting driving connection between said driving means and said blower, electric circuit means including electrically operable control means for selectively interrupting actuating current for said clutch means to thereby make said clutch means ineffective whereby operation of said blower is interrupted, a piston reciprocably mounted in said cylinder; an air intake conduit having one end connected to said engine for communication with said inlet valve means and having its other end extended upwardly so as to remain above the highest level of the water through which the vehicle to be equipped with said engine may pass, a crank case supporting said cylinder, venting conduit means effecting communication between said crank case and said air intake conduit for venting said crank case, valve means arranged within said venting conduit means and movable from a normally open position into a closing position for interrupting communication between said crank case and said air intake conduit, and means responsive to a certain water pressure acting thereupon while said vehicle is passing through water for causing said valve means to move into said closing position and for actuating said control means to bring about stoppage of said blower.

6. In combination in an internal combustion engine for use in connection with a land vehicle adapted to drive through water: an air cooled cylinder; a blower for delivering cooling air for cooling said cylinder, driving means for driving said blower; control means for interrupting the transmission of driving power from said driving means to said blower to thereby cause said blower to stop; a piston reciprocably mounted in said cylinder;

air inlet valve means for admitting air into said cylinder; an air intake conduit having one end connected to said engine for communication with said inlet valve means and having its other end extended upwardly so as to remain above the highest level of the water through which the vehicle to be equipped with said engine may drive; a crank case supporting said cylinder; venting conduit means effecting communication between said crank case and said intake conduit for venting said crank case; valve means arranged within said venting conduit means and movable from an open position for effecting communication between said crank case and said intake conduit into closing position for preventing such communication, and vice versa; and water pressure responsive means operatively connected with said valve means and in response to a certain water pressure exerted upon said water responsive means by the water through which said vehicle is driving for moving said valve means into closing position and actuating said control means to bring about stoppage of said blower.

7. An arrangement according to claim 4, in which that surface of said valve means which is exposed to the pressure in said crank case is so dimensioned that a certain pressure conveyed thereupon from said crank case supplemented by the thrust of said spring means exceeds the water pressure acting upon said diaphragm thereby causing said valve means to open against the water pressure acting upon said diaphragm.

References Cited in the file of this patent

UNITED STATES PATENTS

| | | |
|---|---|---|
| 2,429,732 | Roos | Oct. 28, 1947 |
| 2,650,577 | Bales | Sept. 1, 1953 |
| 2,786,457 | Mickley | Mar. 26, 1957 |